United States Patent [19]

Auracher et al.

[11] Patent Number: 4,784,449

[45] Date of Patent: Nov. 15, 1988

[54] HIGH RESOLUTION ACOUSTO-OPTICAL LIGHT DEFLECTOR

[75] Inventors: Franz Auracher, Baierbrunn; Rudolf Keil, Munich; Michael Stockmann, Munich; Karl-Heinz Zeitler, Munich, all of Fed. Rep. of Germany

[73] Assignee: Siemens Aktiengesellschaft, Berlin and Munich, Fed. Rep. of Germany

[21] Appl. No.: 401,064

[22] Filed: Jul. 23, 1982

[30] Foreign Application Priority Data

Sep. 29, 1981 [DE] Fed. Rep. of Germany ....... 3138745

[51] Int. Cl.$^4$ .............................................. G02B 6/10
[52] U.S. Cl. ................................................. 350/96.13
[58] Field of Search ............................ 350/96.13, 355

[56] References Cited

U.S. PATENT DOCUMENTS 4,297,704 10/1981 Marom et al. ................... 350/96.13

Primary Examiner—William L. Sikes
Assistant Examiner—Robert E. Wise

[57] ABSTRACT

A light deflector includes a plurality of individual acousto-optical light waveguide deflectors being integrated on a common substrate and disposed relative to one or more directions from which or to which a light beam to be deflected will be supplied so that the resolved points is equal to the sum of the resolved points of each of the individual deflectors. Preferably, the individual light deflectors are disposed and aligned on the substrate so that the deflection ranges of the resolved points lie next to one another in a prescribed surface and with the ranges contacting one another without gaps.

19 Claims, 2 Drawing Sheets

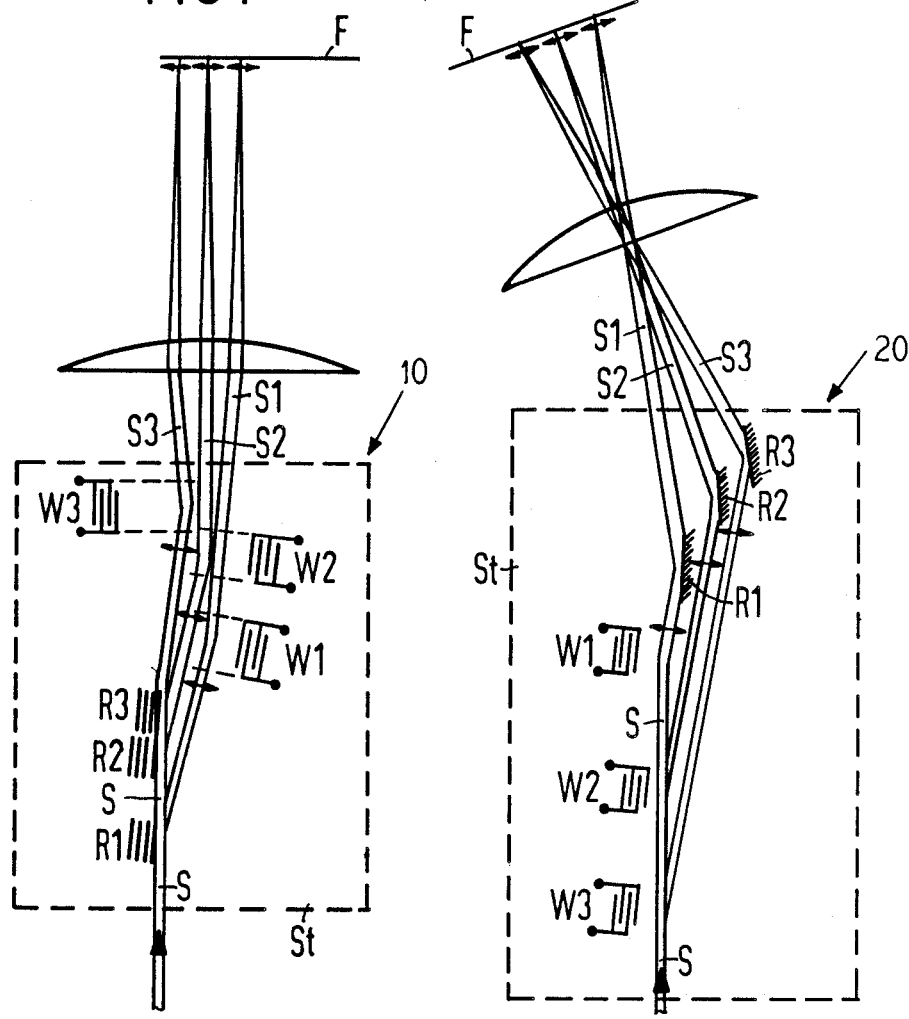

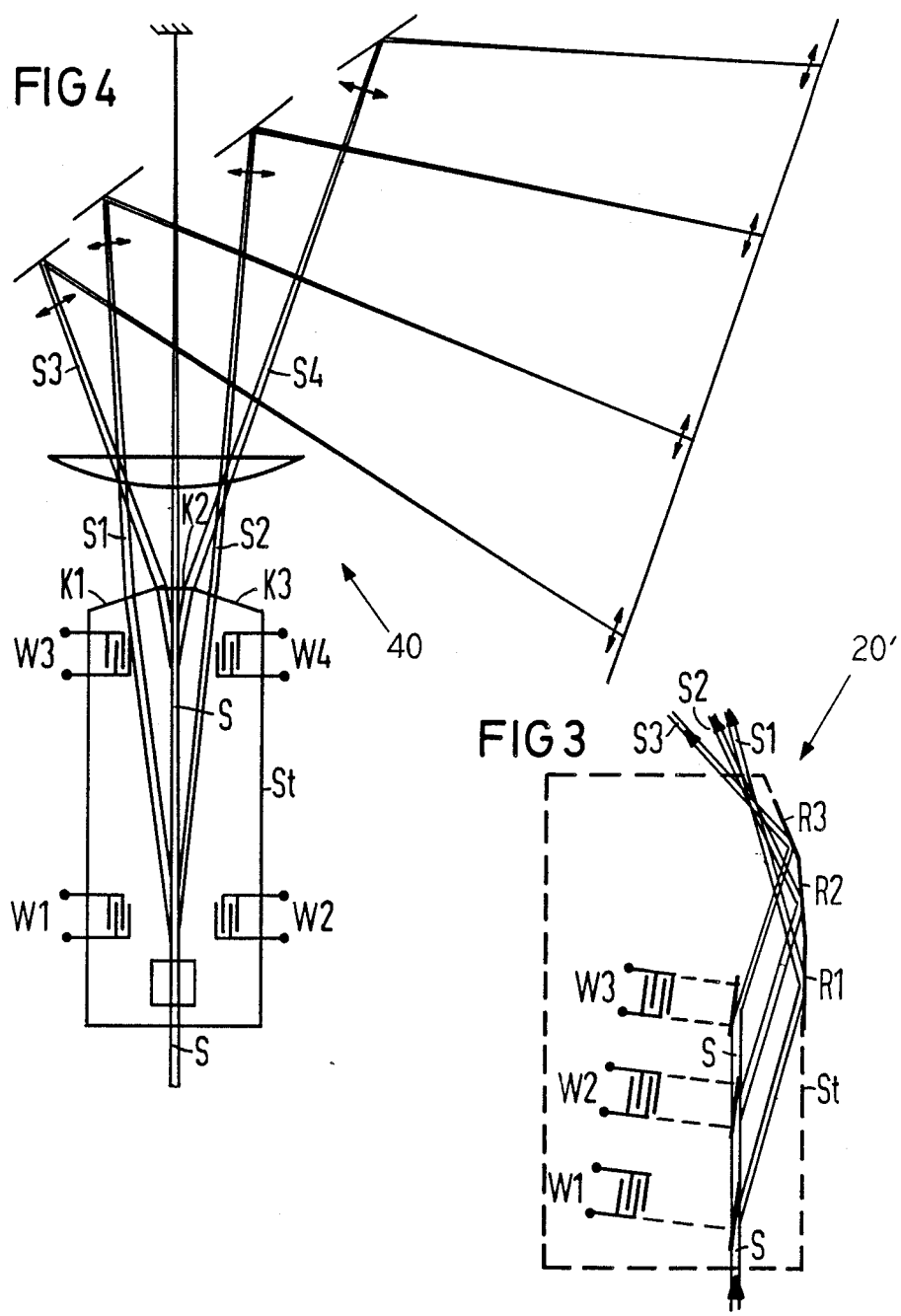

HIGH RESOLUTION ACOUSTO-OPTICAL LIGHT DEFLECTOR

BACKGROUND OF THE INVENTION

1. Field of the Invention

The present invention is directed to an acoustical optical light deflector having a high resolution.

2. Description of the Prior Art

Light deflectors, which can resolve several hundred through a few thousand points, are required for many uses for example for laser printers. Such high resolution is presently achieved only with mechanical deflectors, for example, deflectors utilizing rotating polygonal mirrors or oscillating mirrors. While mechanical deflectors have a very high deflection efficiency, they are relatively slow. Fast deflectors with up to a thousand resolved points but with only a low deflection efficiency can be realized with ultrasonic deflectors in a so-called "bulk" version. However, these fast deflectors and the mechanical deflectors are both relatively expensive to manufacture. Fast deflectors in waveguide version would have an advantage because they can be more easily manufactured with the broad band transducers being photolithographically manufactured in a standard planar technology. In addition, fast deflectors in a waveguide version can be made to do with significantly less high frequency drive power than the bulk deflectors. At present, at most a few hundred points can be resolved with the planar acousto-optical light deflectors.

SUMMARY OF THE INVENTION

The present invention is directed to providing an acousto optic or opto-acoustical light deflector with a high resolution which deflector is suitable for laser beams, is fast, can be manufactured in a planar technology and can resolve a great number of points.

To achieve this object, the present invention is directed to an acousto-optical light device with a high resolution comprising a common substrate and a plurality of individual acousto-optical waveguide light deflectors being integrated on a common substrate in such a manner that the number of resolved points is equal to the sum of the resolved points for each of the individual deflectors.

A particularly advantageous embodiment of the light device of the present invention has individual light deflectors being disposed and aligned on the substrate along at least one direction of the light beams being supplied to the deflector so that the deflection ranges of the resolved points lying next to one another in a prescribed surface or plane with the ranges of adjacent deflectors contacting one another.

The opto-acoustical light device in the present invention also preferably includes a plurality of individual means for reflecting at least a portion of the beam of light from its path which means may be either a mirrored edge of a crystal transparent substrate, a polished edge for reflecting light, a reflecting grating on the substrate or a diffraction surface as the light leaves the substrate. The beam deflectors and the means for reflecting are arranged in a series of pairs of elements along a path of the light beam with the first element of each pair deflecting at least a portion of the beam into the range of the second element of the pair. In other embodiments, deflectors are arranged in pairs next to each other with pairs being superimposed in series along the path of a supply beam and the edge surface of the substrate is polished and acts as means for refracting. It should be noted that when the beam deflectors and the means for reflecting are disposed in series, they are constructed so they may deflect only a part of the light power of the beam. It is also possible that either the means for reflecting or the deflectors are controllable gratings which will respectively deflect as much as possible the overall light power of the beam in a chronological sequence.

The individual beam deflectors may be a grating type deflector which is either a refractive grating or surface grating. It is also possible that the grating may be a controllable grating or a fixed grating. If it is a fixed grating, it can be produced by diffusion of a metal pattern in the form of a grating into the substrate, ion implantation or etching of the surface. However, if it is a controllable grating, the grating may be generated in electro-optical material by applying a constant voltage to a interdigital finger electrode structure or by means of excitation of a surface acoustical wave. The beam deflector and/or reflector forming the means for reflecting may be provided as a refractive index discontinuity in a waveguide which may be generated by means of either an ion implantation, a diffusion of a substance into the waveguide or may be induced electro-optically by the use of electrodes.

BRIEF DESCRIPTION OF THE DRAWINGS

FIG. 1 is a schematic presentation of an embodiment of the light deflector device according to the present invention wherein the light beams to be deflected by the individual deflectors are supplied either successively or simultaneously;

FIG. 2 is an embodiment of the light deflector device according to the present invention in which an additional beam reflector or refractor is disposed in a deflection area of the individual deflectors:

FIG. 3 is an embodiment of the light deflector device according to the present invention similar to the embodiment of FIG. 2 where the edge of the substrate is utilized for providing reflecting surfaces; and FIG. 4 is an embodiment of the light deflector device wherein the beam deflectors are arranged in pairs with the pairs being arranged in series and utilizes the refracting surfaces of the edge of the substrate.

DESCRIPTION OF THE PREFERRED EMBODIMENTS

The principles of the present invention are particularly useful in opto-acoustical light deflector device generally indicated at 10 in FIG. 1. In the deflector device 10, a light beam S is supplied and deflected into three different directions by means of N reflectors R1, R2 and R3 which have been formed in an integrated manner into a substrate ST. Since three reflectors are shown, the embodiment of FIG. 1 has N=3. An individual deflector is provided for each beam direction and each individual deflector is schematically represented by a grating of one of the acoustical transducers W1, W2 and W3 which are also applied on the substrate and are capable of deflecting their respective beams into m positions wherein the deflection range is fixed. The individual deflectors W1, W2 and W3 are disposed in such a manner and are aligned relative to the beams being deflected by the reflectors R1 through R3 up to the deflection range of the individual light deflectors, so that the range of the beams S1 through S3 deflected by the individual deflectors sweep are adjacent gap-free to one another on a specific surface. The surface is determined, for example, by the writing surface F of a laser printer. The reflectors R1, R2 and R3 can be dimensioned in such a manner that the respective $1/N^{th}$ part of the overall light power of the beam S is deflected into each separate path. However, the reflectors can also be controllable gratings, which insofar as possible deflect the overall light power in the direction of the individual deflectors such as W1, W2 and W3 in a chronological succession. In the first case, the acoustical transducers W1–W3 can be simultaneously driven and thus N deflection ranges can be simultaneously written or recorded. In the second case, the transducers W1 through W3 are driven in a chronological succession or sequence that is synchronous, with the gratings R1 through R3.

An embodiment of the acousto-optical light deflector device is generally indicated at 20 in FIG. 2. In this embodiment, the beam deflectors W1, W2 and W3, as well as the reflectors R1, R2 and R3 have their positions interchanged with respect to their positions shown in FIG. 1. However, in both the embodiments of the deflector device 10 and 20, one can employ identical acoustical transducers W1 through W3 for the individual deflectors. It is only the reflectors R1 through R3 which are disposed in a deflection area which must be designed for different angles of incidence of the deflected beam. A grating, which is preferably a refractive grating or a surface grating, can, for example, be employed as the reflectors. The grating can be produced as a fixed grating by means of diffusion of a metal lattice into the substrate, ion implantation or etching of the surface, or can be produced as a controllable grating. For example, a controllable grating can be produced if electro-optical material such as, for example, lithium niobate is either the substrate or a portion of the substrate, and the lithium niobate is provided with a lattice shaped electrode structure on which a constant voltage is applied. The controllable gratings can also be produced by means of exciting a surface acoustical wave. When utilizing a surface acoustical wave, the deflection angle can be retrimmed by means of tuning the acoustical frequency. Instead of gratings, a fixed refractive index discontinuity in the waveguide can be produced, for example, by means of diffusing titanium into the lithium niobate or by means of ion implantation, or the discontinuity can be electro-optically induced by use of electrodes. However, it is only possible to use the refractive index discontinuity when the given angles of incidence of light on the reflector lies close to the boundary angle of total reflection.

The reflectors R1, R2 and R3 can be produced by means of polishing or burnishing of the edges of the substrate ST or if necessary, by applying a mirror layer on the edges. In FIG. 3, an embodiment of the deflector device generally indicated 20' is substantially the same as the embodiment 20 except that the reflectors R1, R2 and R3 are formed by the edge of the substrate ST which has been provided with mirror edges either by the polishing of the substrate edges at the desired angle or by applying a mirror or a reflective layer thereto.

Another embodiment of deflector device is generally indicated at 40 in FIG. 4. The deflector device 40 has a plurality of individual deflectors which are indicated as acoustical transducers W1 through W4 which are not disposed in the manner illustrated in the embodiments 20 and 20' of FIGS. 2 and 3, but are placed in superimposed pairs along the path of the light beam S. The first pair comprise the acoustical transducers W1 and W2 and will split a first pair of branch light beams off of the supply beam S. As the supply beam S travels through the next pair of transducers W3 and W4, another two branch beams are split from the supply beam S. All of these branch light beams, which are split from the supply beam, are not further deflected by reflection but rather are refracted by differently inclined crystal surfaces K1 through K3 so that the first pair of deflected branch beams are refracted as beams S1 and S2 and the second pair of partial or branch beams are refracted as beams S3 and S4. In this manner of functioning, the crystal surfaces K1, K2 and K3 correspond to the reflectors R1 through R3 of the previously mentioned embodiments and are means for refracting.

The proposed light deflector devices exhibit the advantage that N transducers can be manufactured in the same photolithographic process and thus no significant additional outlay of cost is created in comparison to a simpler individual deflector. Given N integrated individual deflectors, the N-fold number of points is achieved in comparison to the individual deflectors. Since the number of resolved points for each of the present individual deflectors lies at a few hundred, the light deflector device is capable of achieving a thousand points or even two thousand points, and this number of points can be used in writing one line in a typical example of laser printer.

Although other various minor modifications may be suggested by those versed in the art, it should be understood that we wish to employ within the scope of the patent granted hereon, all such modifications which reasonably and properly come within the scope of our contribution to the art.

We claim as our invention:

1. An acousto-optical light deflector device with a high resolution for deflecting a beam of light from a source onto a plurality of resolved points, said deflector device comprising a common substrate having a portion forming a waveguide for conducting light of said beam, and a plurality of individual acousto-optical waveguide light deflectors with each deflector being able to deflect light at a plurality of resolved points, said deflectors being integrated on the common substrate in such a manner that the number of resolved points for the device is equal to the sum of the resolved points for each of the individual deflectors.

2. An acousto-optical light deflector device according to claim 1, wherein the individual light deflectors are disposed and aligned on the substrate along at least one direction of the light beam being supplied to the deflector device so that the deflection ranges of the resolved points lie next to one another in a prescribed surface with the ranges contacting one another.

3. An acousto-optical light deflector device according to claim 2, wherein the beam of light from the source is a main beam and wherein the individual deflectors are arranged in pairs along the path of the main beam so that the main beam passes successively between the pairs and each pair operates to branch partial beams from the main beam.

4. An acousto-optical deflector device according to claim 3, wherein each of the individual deflectors comprises controllable gratings formed by an acoustical transducer.

5. An acousto-optical light deflector device according to claim 3, which includes refractive means for deflecting partial beams from the main beam, said refractive means comprising refractive crystal surfaces of the substrate.

6. An acousto-optical light deflector device according to claim 2, which includes a plurality of individual means for reflecting at least a portion of a beam of light from its path, said means for reflecting and said deflectors being arranged in a series of pairs on the substrate with each pair having one deflector and one means for reflecting as a pair of elements, said pairs of elements being disposed along a path of a light beam in the substrate with the first element of each pair deflecting at least a portion of the beam into the range of the second element of each pair.

7. An acousto-optical light deflector device according to claim 6, wherein the first element of each pair consists of a controllable grating which respectively deflects as much as possible the overall supplied power of light in a chronological succession.

8. An acousto-optical light deflector device according to claim 7, wherein the controllable grating is a grating created by producing a surface acoustical wave on a surface of the substrate.

9. An acousto-optical light deflector device according to claim 7, wherein the controllable grating is formed by providing electro-optical material having interdigital finger electrodes, and by applying a constant voltage to said electrodes to produce the grating in the material.

10. An acousto-optical light deflector device according to claim 6, wherein one of the deflectors and means for reflecting of each pair consist of a grating for deflecting light.

11. An acousto-optical light deflector device according to claim 10, wherein the grating is selected as one of a refractive grating consisting of refractive index fluctuations and surface grating with a surface structure.

12. An acousto-optical light deflector device according to claim 11, wherein the grating is selected as one of a fixed grating and controllable grating.

13. An acousto-optical light deflector device according to claim 12, wherein the grating is a fixed grating produced by diffusion of a metal lattice into the substrate, by ion implantation or by etching of the surface of the substrate.

14. An acoustical-optical light deflector device according to claim 6, wherein one of the deflector and the means for reflecting of each pair is a refractive index discontinuity in the waveguide.

15. An acousto-optical light deflector device according to claim 14, wherein the refractive index discontinuity is generated by means of ion implantation or diffusion of a substance into the waveguide.

16. An acousto-optical light deflector device according to claim 14, wherein the refractive index discontinuity is induced electro-optically by applying a constant voltage to electrodes.

17. An acousto-optical light deflector device according to claim 6, wherein the means for reflecting is positioned to receive light deflected by the deflector of said pair.

18. An acousto-optical light deflector device according to claim 17, wherein the means for reflecting comprises a reflecting edge of the substrate.

19. An acousto-optical light deflector device according to claim 6, wherein each of the first elements of the pairs reflects only a part of the light power of the beam of light received by the device.

* * * * *